(12) United States Patent
Brothers et al.

(10) Patent No.: US 6,232,372 B1
(45) Date of Patent: May 15, 2001

(54) MULTICOMPONENT PARTICLES OF FLUOROPOLYMER AND HIGH TEMPERATURE RESISTANT NON-DISPERSED POLYMER BINDER

(75) Inventors: Paul Douglas Brothers, Chadds Ford; Dewey Lynn Kerbow, Landenberg, both of PA (US); Laurence W. McKeen, Sewell, NJ (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/270,922

(22) Filed: Mar. 16, 1999

Related U.S. Application Data (60) Provisional application No. 60/078,503, filed on Mar. 18, 1998.

(51) Int. Cl.[7] ............................... C08K 9/00; C08L 27/00
(52) U.S. Cl. .................... 523/206; 524/514; 524/520; 428/421
(58) Field of Search .......................... 523/206; 524/514, 524/520; 428/421

(56) References Cited

U.S. PATENT DOCUMENTS

| 3,635,926 | 1/1972 | Gresham et al. ................ 260/87.5 |
| 5,093,403 | 3/1992 | Rau et al. ........................... 524/404 |
| 5,230,961 | 7/1993 | Tannenbaum ..................... 428/422 |

FOREIGN PATENT DOCUMENTS

| 0 124 085 | 11/1984 | (EP) | ............................... C09D/3/78 |
| 0 222 945 B1 | 5/1987 | (EP) | ............................... C08F/6/14 |
| 0 226 668 B1 | 7/1987 | (EP) | ............................... C08F/6/14 |
| 0 373 588 | 6/1990 | (EP) | ............................ C08F/259/08 |
| 95/21216 | 8/1995 | (WO) | ............................... C08L/27/12 |

Primary Examiner—Kriellion Sanders (57) ABSTRACT

A composition comprising a plurality of multicomponent particles, one component of each of the particles being melt fabricable fluoropolymer and another component of each of the particles being a high temperature resistant non-dispersed polymer binder. The components of the particles are bound together by mechanical engagement, or alternatively, by chemical interaction. The composition is preferably in the form of a free-flowing powder which is not subject to segregation of component resins during shipping or processing.

27 Claims, 3 Drawing Sheets

|—————— 1 μm ——————|

MULTICOMPONENT PARTICLES OF FLUOROPOLYMER AND HIGH TEMPERATURE RESISTANT NON-DISPERSED POLYMER BINDER

RELATED APPLICATIONS

This application claims the benefit under 35 U.S.C. §119 of Provisional Application Ser. No. 60/078,503 filed Mar. 18, 1998.

FIELD OF THE INVENTION

This invention is in the field of compositions containing fluoropolymer and high temperature resistant polymer binder. Such compositions are useful for coating metal surfaces, including use as a primer in multi-layer coating systems.

BACKGROUND OF THE INVENTION

Fluoropolymer resins, and especially perfluoropolymer resins, are known for their low surface energy and antistick properties, and thermal and chemical resistance. These fluoropolymer compositions do not stick to other materials, especially dissimilar materials, with any practical degree of bond strength.

Some high temperature resistant thermoplastics, such as polyamide imide, polyarylene sulfide and polyether sulfone, have found use as polymer binders in fluoropolymer coating formulations. See, for example U.S. Pat. No. 5,230,961 (Tannenbaum) and U.S. Pat. No. 5,093,403 (Rau et al.). However, for dry powder coating such as discussed in the '403 patent, particle dimensions of the formulation components are determined by grinding or milling capabilities and limit the homogeneity of coatings fabricated from the blend. Such blends also exhibit segregation in shipping, processing and recovery of scrap powder. When using a powder mixture for electrostatic spraying, the components of the mixture tend to segregate. The segregation can produce a variable powder coating composition when the powder is sprayed on a substrate. Another notable problem occurs in electrostatic spray coating in conjunction with the sprayed powder that does not adhere to the target substrate, known as "overspray". Segregation in the overspray prevents direct recycle to the spraying operation.

There remains a need for compositions of melt-fabricable fluoropolymer with high temperature resistant polymer binder in which the components provide a more homogeneous blend, and one resistant to segregation during shipping or processing.

SUMMARY OF THE INVENTION

This invention provides a composition comprising a plurality of multicomponent particles, one component of each of the particles being melt fabricable fluoropolymer and another component of each of the particles being a high temperature resistant non-dispersed polymer binder. The components of the particles are bound together by mechanical engagement, or alternatively, by chemical interaction. The composition is preferably in the form of a free-flowing powder which, because of the components being bound together, is not subject to segregation of component resins during shipping or processing.

In one embodiment, the invention provides a composition comprising a plurality of multicomponent particles wherein the melt fabricable fluoropolymer component of each particle is dispersed in a high temperature resistant polymer binder matrix.

In a second embodiment, the invention provides a composition comprising a plurality of multicomponent particles wherein the melt fabricable fluoropolymer component of each particle is present as a core coated with high temperature resistant polymer binder.

In a third embodiment, the invention provides a composition comprising a plurality of multicomponent particles wherein the melt fabricable fluoropolymer and the high temperature resistant non-dispersed polymer binder components of each particle are bound to one another by chemical interaction, preferably with the polymer binder being in the form of a coating around a core of the fluoropolymer. The melt fabricable fluoropolymer component of the third embodiment has polar functionality.

The invention also provides a general process for making a composition comprising multicomponent particles, one component of each of the particles being melt fabricable fluoropolymer and another component of each of the particles being a high temperature resistant polymer binder, by combining melt-fabricable fluoropolymer particles and a solution of high temperature resistant polymer binder, mixing the fluoropolymer with the solution of polymer binder and isolating a composition of multicomponent particles. The melt-fabricable fluoropolymer may be added in the form of fundamental particles of aqueous fluoropolymer dispersion or in the form of particles of fluoropolymer powder. This general process prevents the polymer binder from combining with a fluoropolymer particle as a dispersion of the polymer binder in the particle.

To make the first embodiment of multicomponent particles, the melt-fabricable fluoropolymer is in the form of an aqueous dispersion of fundamental fluoropolymer particles when combined with a solvent solution of polymer binder wherein the solvent is miscible with the water of the aqueous dispersion, and these ingredients are mixed under conditions of high shear followed by isolating a composition of multicomponent particles of fundamental melt-fabricable fluoropolymer particles dispersed in polymer binder matrix.

To make the second embodiment of multicomponent particles, the melt-fabricable fluoropolymer is in the form of fluoropolymer powder when combined with the solution of polymer binder, and this combining step is followed by mixing the ingredients and isolating a composition of multicomponent particles of the melt fabricable fluoropolymer resin coated with polymer binder resin. Isolation may be by filtration, evaporation or aqueous treatment.

To make the third embodiment of multicomponent particles, the melt-fabricable fluoropolymer is in the form of an aqueous dispersion of fundamental particles of fluoropolymer which contain units of polar functional groups when combined with a solvent solution of polymer binder wherein the solvent is miscible with water, and this combination step is followed by mixing and isolating a composition of multicomponent particles in the form of polymer binder coating bound to a core of melt-fabricable fluoropolymer by chemical interaction.

DETAILED DESCRIPTION

This invention provides for a composition comprising multicomponent particles, one component of the particles being melt fabricable fluoropolymer resin and another component being high temperature resistant non-dispersed polymer binder.

By "non-dispersed polymer binder" is meant that the multicomponent relationship of the particle of the present invention is not one in which the polymer binder component is dispersed in the fluoropolymer component. Thus the polymer binder component of this invention is not in the form of filler dispersed in fluoropolymer component. The multicomponents of each particle of the present invention are bound together either by mechanical engagement or by chemical interaction. If by mechanical engagement, the fluoropolymer component is dispersed in a matrix of polymer binder or is in the form of a fluoropolymer coated with polymer binder, in either case the binder is non-dispersed. If by chemical interaction, the polymer binder is also in the form a of a coating around a core of fluoropolymer, the polymer binder being non-dispersed. Non-dispersed polymer binder being present at the surface of the multicomponent particles of this invention promotes adherence of the particles to a substrate when the composition is used as a coating.

By "coated" as used herein means that the polymer binder surrounds or partially surrounds a fluoropolymer core.

The composition is preferably in the form of a free-flowing powder. Unlike prior art blend formulations, each multicomponent particle of this invention contains both components of the composition. The resultant free-flowing powder is not subject to segregation of component resins during shipping or processing and the components.

By "free-flowing powder" is meant a powder which will pour (flow) freely at room temperature, and is sprayable with electrostatic spraying apparatus. Such free-flowing powder is suitable for use in various powder coating processes such as fluidized bed coating and electrostatic spray coating.

Such free-flowing powder can be used, either as a single coating, or in some preferred cases, as a primer coat in a multilayer fluoropolymer coating system. Coating of free-flowing powder has application to cookware articles such as fry pans, sauce pans, rice cookers, grills, and bakeware as well as to numerous industrial applications such as fuser rolls or belts for copiers and printers, chemical processing reactors including, tanks, impellers, pipes, valves and chutes. Free-flowing powders of this invention also have application in medical devices such as metered dose drug inhalers. The advantage of free-flowing powder over liquid coating systems include the absence of volatile organic solvents. Advantages over other dry powder systems includes non-segregation during powder coating and the ability to recycle any excess coating application. This means that the overspray can be collected and recycled instead of being scrapped.

Fluoropolymers that can be used in the practice in all of the embodiments of this invention are melt-fabricable. The molecular weight of the melt-fabricable tetrafluoroethylene (TFE) copolymers is unimportant except that it be sufficient to be film-forming. As such, they normally have melt viscosity (MV) in the range of from $0.1 \times 10^3$ Pa·s to $60–100 \times 10^3$ Pa·s as customarily measured for the fluoropolymer in question, though MV outside this range is known. Preferably, MV is in the range of from $0.5 \times 10^3$ Pa·s to $20 \times 10^3$ Pa·s.

Any melt-fabricable fluoropolymer having properties suitable for the intended application can be used in this invention. Such fluoropolymers are polymers of at least one fluorine-containing monomer, but may incorporate monomers containing no fluorine, and contain at least 35 wt % of fluorine based on total weight of polymer. The fluorinated monomers are usually selected from the group consisting of fluoroolefins and fluorinated vinyl ethers. For high temperature applications, preferred fluoropolymers include tetrafluoroethylene (TFE) polymers. Such TFE polymers are usually copolymers of TFE and at least one fluorinated copolymerizable monomer (comonomer) present in the polymer in sufficient amount to reduce the melting point of the copolymer substantially below that of TFE homopolymer, polytetrafluoroethylene (PTFE), e.g., to a melting temperature no greater than 31 5° C. Preferred comonomers with TFE include the perfluorinated monomers such as perfluoroolefins having 3–6 carbon atoms and perfluoro(alkyl vinyl ethers) (PAVE) wherein the alkyl group contains 1–5 carbon atoms, especially 1–3 carbon atoms. Especially preferred comonomers include hexafluoropropylene (HFP), perfluoro(ethyl vinyl ether) (PEVE), perfluoro (propyl vinyl ether) (PPVE) and perfluoro(methyl vinyl ether) (PMVE). Preferred TFE copolymers include FEP (TFE/HFP copolymer), PFA (TFE/PAVE copolymer), TFE/HFP/PAVE wherein PAVE is PEVE and/or PPVE and MFA (TFE/PMVE/PAVE wherein the alkyl group of PAVE has at least two carbon atoms.).

As one skilled in the art will recognize, mixtures of different types of fluoropolymers can be used in the practice of this invention. In general, however, a single fluoropolymer is used.

The high temperature resistant polymer binder component of the present invention is composed of polymer which is film-forming upon heating to fusion, is thermally stable and has a sustained use temperature of at least about 140° C. This component is well known in primer applications for non-stick finishes, for adhering the fluoropolymer-containing layers to substrates, particularly metal substrates and for film-forming within and as part of the layer. The fluoropolymer by itself has little to no adhesion to a substrate. The binder is generally non-fluorine containing and yet adheres or is reactive to the fluoropolymer. Preferred binders are those that are soluble in a solvent, and in some embodiments, preferably a solvent that is miscible with water. Examples of such polymer binders include one or more: (1) polysulfones, which are amorphous thermoplastic polymers with a glass transition temperature of about 185° C. and a sustained service temperature of about 140° C. to 160° C., (2) polyethersulfones (PES), which are amorphous thermoplastic polymers with a glass transition temperature of about 230° C. and a sustained temperature service of about 170° C. to 190° C., (3) polyimides, polyamide imides (PAI) and/or polyamic acid salt which converts to polyamide imide, which imides crosslink upon heating of the coating to fuse it and have a sustained service temperature in excess of 250° C., among others. All of these polymers are thermally stable and dimensionally stable at temperatures within their sustained service range and below, and they are wear resistant. These polymers also adhere well to clean metal surfaces.

One skilled in the art will recognize the possibility of using mixtures of high temperature resistant polymer binders in the practice of this invention, provided that the polymer binders are all soluble in the same solvent. Normally, however, a single polymer binder is used to produce bicomponent particles.

The weight ratio of fluoropolymer resin and polymer binder in the multicomponent particle can vary widely. The binder should be present in an effective amount to bind the composition to a substrate on which the composition is being applied and the fluoropolymer resin should be present in an effective amount to provide a non-stick surface to the coating made from the particles. In addition the binder is present in an amount that coats the fluoropolymer particles or glues them together but in not too great amount that processing and/or flowability of the resultant composition is hampered.

The multicomponent particles of the present invention, each containing melt-fabricable fluoropolymer and high temperature resistant non-dispersed polymer binder can be made by combining melt-fabricable fluoropolymer and a solution of high temperature resistant polymer binder in a solvent, mixing the fluoropolymer with the solution of polymer binder and isolating a composition of multicomponent particles The solvent used in the practice of this invention will generally be an organic solvent which dissolves the high temperature resistant polymer binder that is used and is preferably, for certain embodiments to be discussed below, miscible with water in all proportions needed for the practice of the present invention. Such solvents include N-methylpyrrolidone (NMP), dimethylformamide, dimethylacetamide, dimethylsulfoxide, cresylic acid, sulfolane, and formamide which will depend on the particular polymer binder being used. NMP is a preferred solvent because of its relative safety and environmental acceptability. One skilled in the art will recognize that mixtures of solvents can be used. However, a single solvent is ordinarily used.

Methods for isolating the composition of multicomponent particles include decanting, centrifuging, filtering, evaporation and aqueous treatment as will be discussed below with respect to various embodiments of the invention.

The dried solids as isolated can be used as such, if particle characteristics are suitable for intended use. If aggregates are too large and/or irregular, the dried solids can be finished by techniques common to the art of finely divided solids, such as grinding and segregation by size, to obtain free-flowing powders.

The multicomponent fluoropolymer particle composition of the present invention is useful for coating purposes, either to make a single coating or as a layer in a multi-layer coating system, and is especially useful to make a primer coat. Such coatings can be made from the isolated and dried composition, either by depositing the dried powder by one of various powder coating techniques or by suspending the dried powder in a suitable liquid with suitable surfactants or viscosity modifiers as desired and depositing the composition by a wet coating technique. Additionally, the composition can be isolated without drying and resuspended in a suitable solvent, and the resultant suspension used in wet coating methods.

Embodiment I

In the first embodiment of this invention, the components of the multicomponent particles are bound together in mechanical engagement. The multiple particles of melt fabricable fluoropolymer are coated by and glued together by high temperature resistant polymer binder which constitutes a dispersion of fluoropolymer particles in a polymer binder matrix. The fluoropolymer component is derived from fundamental particles of aqueous fluoropolymer dispersion. Aqueous dispersion polymerization of fluoropolymers is well known. See, for example, U.S. Pat. Nos. 2,946,763; 3,132,124; 3,635,926; 4,380,618; and 5,700,889. Preferably, for this embodiment, such dispersions are used as-polymerized, except for possible dilution. Since the intent is to form and isolate a suspension, there is no need for the expense of concentrating and/or stabilizing the raw (as-polymerized) dispersion. As used herein, the term "fundamental particle" refers to the particle produced by aqueous dispersion polymerization, whether in such dispersion or isolated from such dispersion. When produced by aqueous dispersion polymerization, the resin particles can be small, with average particle size typically in the range 0.01–0.35 micrometer, usually 0.05–0.25 micrometer.

Preferred polymer binders for the first embodiment of this invention include polyamic acid salt, polyamide imide (PAI) and polyethersulfone (PES). Such resins are commercially available.

In the process for making multicomponent particles of the first embodiment of the present invention, a solution of polymer binder and an aqueous dispersion of fundamental fluoropolymer particles are brought together and agitated vigorously to cause a precipitate of fundamental fluoropolymer particles entrained in polymer binder resin. By vigorous agitation is meant that sufficient stirring occurs to ensure the precipitation of multicomponent particles in the form of a suspension and not a coagulated lump or string of polymer and/or binder. The precipitate is suspended by continued agitation, optionally aided by the addition of electrolyte such as inorganic acid. The precipitate can be isolated from the liquid by known means such as by filtration or vacuum-assisted filtration. Desirably, the solids so isolated are washed in water to help reduce residual solvent to low levels, preferably below around 0.5%, before drying.

Variables that can be manipulated in the process of the present invention include the concentration of polymer binder solution, the concentration of fluoropolymer dispersion, the relative amounts of water and solvent, and the relative amounts of fluoropolymer and polymer binder resins.

Preferably, the ratio of the amount of water to the amount of solvent brought together in the process of this invention is high in order to extract solvent from, and to form solvent-free hard particles of the precipitated multicomponent particles. Usually, the amount of water is at least equal to, and is preferably at least 125% of the amount of solvent used, with amounts expressed on a weight basis. This consideration makes it desirable, though not necessary, to add polymer binder solution to aqueous fluoropolymer dispersion in batch operations. One skilled in the art will recognize that the aqueous and non-aqueous components can be combined in many other ways, such as by co-mingling flowing streams in desired proportions.

The concentration of fluoropolymer solids in the dispersion is usually no more than 20 wt %, preferably no more than 15 wt %. There is no lower limit on the concentration of fluoropolymer solids in the aqueous medium for effective practice of the process of the present invention. That is, the process can be operated to obtain a very low concentration of fundamental fluoropolymer particles in polymer binder resin. However, the dispersion concentration should be chosen to obtain at least 10 wt % of fluoropolymer resin in the resultant free-flowing powder.

The concentration of polymer binder resin in the solution used in the process of the present invention should be effective to allow precipitation of small particles of multicomponent particles under the conditions of mixing with vigorous agitation. Effective concentrations are relatively low, because solutions having high concentration of polymer binder tend to result in larger masses of precipitated polymer binder from which solvent can be difficult to remove and/or which can be difficult to break up by processes such as grinding. Generally, the concentration of polymer binder resin in the solvent is no more than about 15 wt %, preferably no more than 10 wt %, based on combined weight of polymer binder resin and solvent.

In this first embodiment, the amount and concentration of fluoropolymer dispersion and the amount and concentration of polymer binder solution should be selected within the foregoing ranges to obtain the desired free-flowing powder composition. Generally, the ratio of fluoropolymer resin to polymer binder resin is in the range of from 90/10 to 60/40 by weight, preferably in the range of from 85/15 to 70/30. Surprisingly, the free-flowing powder of the present invention is not a mixture of fluoropolymer resin agglomerates and polymer binder resin agglomerates, but rather comprises fluoropolymer fundamental particles entrained in matrix particles of polymer binder resin. Because, the fluoropolymer particles are entrained in the polymer binder, the components of the free-flowing powder do not segregate during shipment or processing.

In the first embodiment of this invention, the multicomponent fluoropolymer particles that are formed have an average diameter of from about 5 to 40 micrometers, preferably with an average particle size of from about 15 to 25 micrometers. The multicomponent particles may be present in the composition as aggregates. If aggregates are too large and/or irregular, the dried solids can be finished by techniques common to the art of finely divided solids, such as grinding and segregation by size, to obtain free-flowing powders. Despite the fact that some milling may be necessary, the powder compositions of this invention are more homogeneous than prior art powder formulations and are not subject to separation of components during shipping or processing.

Embodiment II

In the second embodiment, the components of the multicomponent particles are bound together by mechanical engagement. The melt fabricable fluoropolymer forms a core which is coated with polymer binder. By "coated" is meant that the polymer binder surrounds or partially surrounds the fluoropolymer core. The fluoropolymer component is derived from particles of fluoropolymer powder. Melt-fabricable fluoropolymer may be produced by well known techniques such as dispersion polymerization, suspension polymerization, and non aqueous polymerization. In particular if aqueous dispersion polymerization is used as discussed above, the dispersions are not used as-polymerized for this second embodiment. Rather, fluoropolymer powder can be obtained by known preparation methods which include for example, dispersion polymerization followed by solvent assisted pelletization to form polymer bead, with subsequent drying and grinding to form fluoropolymer powder particles as described in U.S. Pat. Nos. 3,585,160; 4,742,122 and 4,714,756. Alternately fluoropolymer powder may be produced by compaction of dry coagulated TFE copolymer fluff and grinding as described in U.S. Pat. No. 4,898,779 or by atomizing aqueous fluoropolymer dispersion into a sintering chamber at the melting point of the polymer. Preferred fluoropolymer powders for the second embodiment of this invention are PFA powder which is commercially available.

Preferred polymer binders for the second embodiment of this invention include polyamide imide (PAI), polyamic acid salt, polyethersulfone (PES), polyimide or a mixture of these resins. Such resins are commercially available.

In the process for making multicomponent particles of the second embodiment, dry fluoropolymer powder particles, having an average particle diameter of typically from 5 to 40 micrometers, are added to a solution of high temperature resistant polymer binder and mixed vigorously to provide a liquid from which solids are isolated and dried to produce a multicomponent particles of melt fabricable fluoropolymer resin coated (i.e., surrounded or partially surrounded) with polymer binder. Mixing can be done by dispersal in a media mill such as a Netzsch mill, or in a high speed disperser or in a Roto-Stator type of mixer. In this embodiment, isolation of solids are achieved by varying ways. One method of isolation is to filter the liquid, optionally using vacuum assistance. Another possible method of isolation is to evaporate off the liquid using well known drying techniques with or without heat assistance or vacuum assistance. A third possible method is to treat the liquid with water or an aqueous solution of inorganic electrolyte to precipitate a solid that is separated and dried by conventional techniques. Other conventional methods of isolation may of course be used.

Variables that can be manipulated in the process of the present invention include the concentration of polymer binder solution, the amount of fluoropolymer powder added, the relative amounts of water and solvent, and the relative amounts of fluoropolymer and polymer binder.

The concentration of polymer binder in the solution is typically in the range of from 5 to 20% based on the combined weight of polymer binder and solvent. The concentration of fluoropolymer powder when added to the solution is typically in the range of from 20 to 50% based on weight of solids. When water or an aqueous solution of inorganic electrolyte is used to precipitate the solid multicomponent particles, the typical amount added is in the range of from 50% to 200% based on total volume.

In the second embodiment of this invention, the multicomponent fluoropolymer particles that are formed have an average diameter of from about 5 to 40 micrometers, preferably from about 15 to 25 micrometers. The multicomponent particles may be present in the composition as aggregates. If aggregates are too large and/or irregular, the dried solids can be finished by techniques common to the art of finely divided solids, such as grinding and segregation by size, to obtain free-flowing powders. Despite the fact that some milling may be necessary, the powder compositions of this invention are more homogeneous than prior art powder formulations and are not subject to separation of components during shipping or processing.

Typically, the ratio of fluoropolymer to binder in the second embodiment of this invention is in the range of 98/2 to 70/30 by weight, preferably 95/5 to 80/20. The powder of multicomponent particles is free-flowing and not subject to separation of components during shipping or processing.

Embodiment III

In the third embodiment of this invention, the components of the multicomponent particles are bound together by both chemical interaction and mechanical engagement. The melt fabricable fluoropolymer component and the polymer binder component are reactive to one another and the polymer binder is in the form of a coating or shell around a core of melt-fabricable fluoropolymer. The fluoropolymer component is derived from fundamental particles of aqueous fluoropolymer dispersion and contains polar functional groups. By chemical interaction is meant, the affinity of the polar functional group on the surface of the fluoropolymer dispersion particle for the polymer binder, e.g., amide or imide group present in the binder. Such interaction can be confirmed by observing the increase in size of the multicomponent particle as compared to the fundamental particle along with the discrete nature of the multicomponent particle, which in contrast to Embodiment I, is separate from a matrix of polymer binder.

Aqueous polymerization of fluoropolymers is well known as discussed above under the first embodiment. Specifically, the third embodiment of the present invention provides aqueous fluoropolymer dispersion particles having small amounts of polar functional groups present at least at the surface of the particles which are coated with polymer binder. The functionality of the group is selected to be reactive with the particular polymer binder being used. For ease of reactivity and economic availability of compounds which impart polar functionality to the fluoropolymer particle, PAI and polyamic acid salt are the preferred polymer binders in the embodiment. The resultant multicomponent particle contains a fluoropolymer core coated with a polymer binder shell. The process of forming such particles is carried out by mixing aqueous fluoropolymer dispersion and a solution of PAI. In this process, the functional group present at the surface of the fluoropolymer particle provides a site that interacts with the PAI resin.

Generally, the fluoropolymer core has dimensions of fluoropolymer dispersion particles, e.g., 0.01–0.35 micrometer average diameter, and the multicomponent particle has average diameter that is 5–25% greater than the diameter of the fundamental fluoropolymer particle, e.g., 0.012–0.43 micrometer. The multicomponent particles may be present in the composition as aggregates. If aggregates are too large and/or irregular, the dried solids can be finished by techniques common to the art of finely divided solids, such as grinding and segregation by size, to obtain free-flowing powders. Despite the fact that some milling may be necessary, the powder compositions of this invention are more homogeneous than prior art powder formulations and are not subject to separation of components during shipping or processing.

Typically, the ratio of fluoropolymer to binder in compositions of the invention is in the range of from 0.1/1 to 5/1, more commonly in the range of from 0.5/1 to 4/1, and preferably in the range of from 1/1 to 3/1, with proportions being by weight.

Polar functional groups are groups that have dipoles and when incorporated into the fluoropolymer, the fluoropolymer exhibits polarity. Polar functional groups are incorporated into the fluoropolymer on at least at the surface of the fluoropolymer particle and capable of chemical interaction in aqueous medium within the temperature range of 0°–100° C. Polar functional groups can be introduced into the fluoropolymer by (a) incorporating monomer units having polar functional groups (also referred to as functional monomers) during polymerization, (b) grafting polar entities on to previously polymerized dispersion particles and/or (c) chemically treating polymer end groups and the like. In the case of (b) or (c), the fluoropolymer can be the same as described herein before. In the case of (a), the preferred fluoropolymers are the same as described above, but wherein the functional monomer is present as an additional monomer. Examples of polar functional groups include ester, alcohol, acid (including carbon-, sulfur-, and phosphorus-based acid) and salt and halide thereof. Other functionalities include cyanate, carbamate, nitrile, and the like. Specific functional groups that can be used include $—SO_2F$, $—CN$, $—COOH$ and $—CH_2—Z$ wherein $—Z$ is $—OH$, $—OCN$, $—O—(CO)—NH_2$, or $—OP(O)(OH)_2$. The functional group is selected so as to be chemically interactive with the particular polymer binder used. As one skilled in the art will recognize, more than one type of functional group can be present. Normally, however, a single type of functional group is used.

The fundamental particles of fluoropolymer resin used in this invention can be produced by polymerization processes that yield particulate product as polymerized, wherein the functional monomer is present at least toward the end of the polymerization to form polymer particles having copolymer which contains units derived from the functional monomer at the particle surface. If the functional monomer is present only toward the end of polymerization, the resultant fluoropolymer particle itself will have a core/shell structure, with core and shell differing at least by the presence of functional units in the fluoropolymer particle shell.

In making the fluoropolymer particles of this embodiment of this invention, the polymerization process is preferably carried out so as to form a core/shell particle structure, wherein the shell of the fluoropolymer resin particle is distinguished from the core of the particle at least by the presence in the shell of a concentration of functional comonomer that is not present in the core. Preferably, there is no functional comonomer in the core, since functional comonomer can detract from the chemical and/or thermal properties of the fluorinated polymer, such as by reducing compatibility with non-functional fluoropolymer, and is costly. There can be other differences between core and shell of the fluoropolymer particle, for example, a molecular weight difference or a difference in polymer composition aside from the presence of functional monomer. Furthermore, the core and/or the shell can vary in composition and/or molecular weight. Such variations can be sharply defined, so that the particle can have a multiplicity of discrete layers, or the radial variations can be gradual. However, in the context of the present invention, the core/shell interface in the fluoropolymer particle is considered to be the boundary between polymer preferably containing no functional monomer and polymer containing functional monomer. Thus, the preferred fluoropolymer particle can be described as having a core of a first fluoropolymer and a shell of a second fluoropolymer, with first and second fluoropolymers distinguished at least by the presence in the shell of units derived from functional monomer. Generally, the shell is no more than 25% of the particle by weight, and can be substantially less, for example, 10% or 5%. When the fluoropolymers of the core and the shell are both TFE polymers, the core and shell fractions of the particle are defined by the weight of TFE consumed, respectively, before and after the functional monomer is introduced.

Functional monomers that introduce polar functional groups can have the general formula $CY_1Y_2=CY_3-Z$ wherein each Y is independently H, F, or Cl and Z contains a functional group. Preferably, each Y is F and —Z is —$R_f$—X, wherein $R_f$ is a fluorinated diradical and X is a functional group that may contain $CH_2$ groups. Preferably, $R_f$ is linear or branched perfluoroalkoxy having 2–20 carbon atoms, so that the functional comonomer is a fluorinated vinyl ether. Examples of such fluorovinylethers include $CF_2=CF[OCF_2CF(CF_3)]_mO(CF_2)_nCOOH$ as disclosed in U.S. Pat. No. 4,138,426. In this formula, m=0–3 and n=1–4. Preferred such fluorovinylethers include $CF_2=CF-O-CF_2CF_2-SO_2F$; $CF_2=CF[OCF_2CF(CF_3)]O(CF_2)_2-Y$ wherein —Y is —$SO_2F$ or —COOH; and $CF_2=CF[OCF_2CF(CF_3)]O(CF_2)_2-CH_2-Z$ wherein —Z is —O—(CO)—$NH_2$ or —OP(O)(OH)$_2$. These fluorovinylethers are preferred because of their ability to incorporate into the polymer and their ability to incorporate functionality into the resultant copolymer.

Compounds having the formula $CF_2=CF-R_f-(CH_2)_n-X$ in which X is —OCN (cyanate), —O—(CO)—$NH_2$ (carbamate), or —OP(O)(OH)$_2$ (phosphono) can be synthesized as follows. The cyanate can be prepared in high yield by a one-step process in which known compounds having the general formula $CF_2=CF-R_f-(CH_2)_n-OH$ (I), wherein n is 1–3 and $R_f$ is perfluorolkyl or perfluoroalkoxy containing 1–20 carbon atoms, are reacted with cyanogen bromide (CNBr) or cyanogen chloride (CNCl) in the presence of non-nucleophilic base. The carbamate can be prepared from the cyanate by contacting cyanate with acid at elevated temperature for time sufficient to complete conversion of cyanate to carbamate. The phosphorus-containing compounds can be prepared in high yield by a process in which compounds (I) are reacted with P(O)Cl$_3$ or P(O)Br$_3$, either neat or in aprotic solvent, to obtain the chloride or bromide, e.g., $CF_2=CF-R_f-(CH_2)_n-OP(O)(Cl_2)$, followed by hydrolysis to obtain the acid —OP(O)—(OH)$_2$.

The amount of functional monomer in the fluoropolymer particles of this invention is small. Generally, the amount of functional monomer in the particle is no more than 5 wt %, preferably no more than 3 wt %, based on total weight of fluoropolymer. When the functional monomer has sulfonyl functionality, it is desirable for the amount of functional monomer to be no more than 1 wt %, especially no more than 0.5 wt %. The amount of functional monomer can be as low as 0.01 wt %, and even less depending on the stage at which the functional monomer is introduced into polymerization. When the functional monomer is confined to the shell of the fluoropolymer particle, the shell containing the functional monomer is preferably no more than 25% of the particle, based on TFE consumed in polymerization, and can be substantially less, for example, as little as 10%, or even 5%, of the particle. It is not necessary to have a uniform concentration of functional monomer throughout the shell. Generally, it is preferred for functional monomer concentration to be highest at the particle surface. This can be achieved, for example, by starting addition of functional monomer at a selected point in the polymerization batch and continuing addition to the end of polymerization.

An alternative way to incorporate polar functional groups onto the surface of fluoropolymer particles is by grafting ethylenically unsaturated compounds having acid, ester or anhydride functionality in the presence of ionizing radiation as described in U.S. Pat. No. 5,576,106.

In the process for making multicomponent particles of the third embodiment of the present invention, functional fluoropolymer dispersion and a dilute miscible solution of polymer binder resin are brought together to obtain a precipitate comprising particles having fluoropolymer core and polymer binder shell. This process can be carried out as follows. Fluoropolymer aqueous dispersion as described above is placed in a suitable vessel. Means for vigorous agitation are not required. Any convenient concentration of fluoropolymer solids in the dispersion can be used. Preferably, the solids content of the dispersion is in the range of 10–30 wt % based on combined weight of fluoropolymer and liquid. A solution of polymer binder, e.g., PAI, resin in suitable solvent, e.g., NMP, is prepared. Any convenient solution concentration can be used. Preferably, the PAI concentration in the solution is in the range of 1–10 wt %, preferably 3–7 wt %, based on combined weight of PAI and solvent. The PAI solution is added to the fluoropolymer dispersion until most of the solids precipitate and any excess of PAI in solution is minimal, for example, as indicated by the color of the liquid. Preferably, the mixture is not agitated during combination of ingredients, though combination of large quantities of dispersion and solution may require gentle stirring to achieve satisfactory mixing and avoid coagulation. This process is another aspect of the invention. One skilled in the art will recognize that variations of this mixing procedure can be used, such as the inverse order of addition of components or alternating addition of components, and are within the scope of the present invention. The precipitated solids can be separated from the liquid by conventional means, such as by filtering or by centrifuging and decanting, and washed and dried.

Test Methods

Test panels of aluminum and cold rolled steel 4.0"×12.0" (10.1 cm×30.5 cm) panels are cleaned with an acetone rinse. The panel may have a smooth surface or a grit blast surface. The panels are coated with free-flowing powder compositions according to the first, second and third embodiments of this invention. The panels are subjected to the following adhesion test.

Post Boiling Water Fingernail Adhesion (PWA)

Coated test panels are submerged in boiling water for 15 minutes. The water is allowed to come to a full boil after inserting the coated panel, before timing is begun. After the boiling water treatment, the panel is cooled to room temperature and dried thoroughly. The fingernail scratch test involves the use of the fingernail, to chip or peel away the coating from the edge of a deliberate knife scratch in the film, to test the degree of adhesion of the film. Improved adhesion is judged by the distinctively increased difficulty in peeling the film from the panel. In some cases the film cannot be peeled from the panel.

EXAMPLES

Unless otherwise stated in the following examples, solution concentrations are in wt % based on the combined weights of solute and solvent.

The solids content of fluoropolymer dispersions were determined gravimetrically, and are stated in wt % based on the combined weights of solids and liquid.

Average particle size of multicomponent particles was measured by laser light scattering.

Fluoropolymer compositions were determined by $^{19}$F NMR.

Unless otherwise stated, melt flow rate (MFR) was measured at 372° C. by the method of ASTM D-1238 modified as described in U.S. Pat. No. 4,380,618. MFR is related to melt viscosity (MV) by the relationship MV=53.15/MFR, when MFR is in units of g/10 min and MV is in units of $10^3$ Pa·s.

Thermal characteristics of fluoropolymer resins were determined by DSC by the method of ASTM D-4591-87. The melting temperature reported is the peak temperature of the melting endotherm.

Embodiment I—Examples

The fluoropolymer dispersion used in the Examples 1, 2, and A below was a raw, i.e., as polymerized, dispersion of TFE/PPVE copolymer (PFA) produced generally according to U.S. Pat. No. 3,635,926 without buffer and without solvent present. The copolymer contained about 3.9 wt % of PPVE and had MV of about $2.8 \times 10^3$ Pa·s. The raw dispersion contained 30.3 wt % solids. Average particle size of the PFA particles was 0.13–0.18 μm.

Two PAI resins were used in the examples of the first embodiment. One, hereinafter PAI-1, (used in Examples 1) was a 36 wt % solution of PAI resin in an NMP-based solvent containing naptha and butyl alcohol in ratio NMP/naptha/alcohol=40.5/21.5/2.0 (grade PD-10629, Phelps-Dodge Magnet Wire Co.). The second PAI resin, hereinafter PAI-2, (used in Example 2 and A) was Torlon® AI-10 poly(amide-imide) (Amoco Chemicals Corp.), a solid resin containing 6–8% of residual NMP.

Polyamic acid salt is used in combination with PAI-2 in Example 2. Polyamic acid salt is generally available as polyamic acid having an inherent viscosity of at least 0.1 as measured as a 0.5 wt % solution in N,N-dimethylacetamide at 30° C. It is dissolved in a coalescing agent such as N-methyl pyrrolidone, and a viscosity reducing agent, such as furfuryl alcohol and reacted with tertiary amine, preferably triethyl amine to form the salt which is soluble in water, as described in greater detail in U.S. Pat. No. 4,014,834 (Concannon).

Example 1

A 52.8 g sample of PFA dispersion (30.3 wt % solids) was diluted with 107.2 g of demineralized water to 10 wt. % solids. This dilute dispersion was placed in a Waring blender which was equipped with a rheostat to allow speed control. The dispersion was agitated at the minimum speed at which the blender would maintain constant speed operation (but still vigorous agitation, consistent with the performance of such blenders). This corresponded to a rheostat setting of about 25% of full scale. To the agitated dispersion, 80 g of a 5 wt % solution of PAI-1 resin in NMP, prepared by diluting the solution as-received with NMP, were added slowly. Precipitation of the PAI was immediately evident. After addition was complete, 50 g of a solution of 1 volume part of concentrated hydrochloric acid in 10 volume parts of water were added and agitation was continued for about 5 min.

The resulting suspension was vacuum filtered using Whatman® #54 paper (Whatman Paper Ltd.) in a Bucherer funnel. (Prior to HCl addition to the mixture, the suspension would pass through the filter paper, illustrating the very small particle size obtained by the process above.) The solids were then resuspended in about 200 mL of water and agitated to expose the particle surface to additional extraction of NMP. The new suspension was again filtered, and the wash/filtration cycle repeated twice more to insure minimum levels of residual NMP. The wet solids were then dried in a circulating air oven at 100°–110° C. to obtain a free-flowing powder which was suitable for powder coating by processes such as electrostatic spraying.

Figure 1:
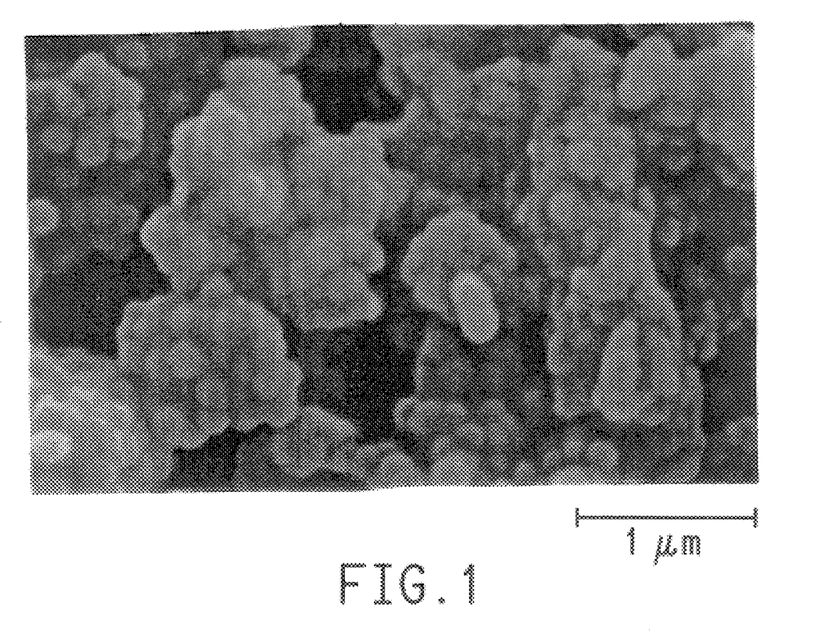
FIG. 1 is a scanning electron micrograph at 30,000 magnification of a fluoropolymer/polyamide imide composition as prepared according to Example 1 representative of the multicomponent particles of the first embodiment. The clearly-defined fluoropolymer fundamental resin particles are dispersed in a matrix of polyamide-imide, analogous to the confection known as peanut brittle. Note 1 micrometer scale bar.

The dried mixture was analyzed (Coulter particle size analyzer) to have an average particle size of about 100 μm with evidence of a major fraction at about 6–10 μm and another fraction at about 200 μm. Electron photomicrographs illustrate that the powder was composed of particles having irregular shapes and comprised of fluoropolymer fundamental particles entrained in a matrix of PAI resin as shown in FIG. 1.

The dried mixture was suspended in isopropanol to allow drawing down a thin coating on smooth aluminum sheet 0.025 inch (0.6 mm) thick (Q-Panel Co., Stock #4-412). As analyzed in isopropanol, the average particle size is about 15 to 20 μm. After air drying, the coated aluminum was baked in a circulating air oven at 800° F. (427° C.) for 10 min. The resulting dark-brown coating was smooth and was strongly adhered to the aluminum, as evidenced by inability to remove the coating with extreme thumbnail pressure, both as-coated and after boiling the coated panel in water for 30 min.

This example illustrates that fluoropolymer fundamental particles are incorporated in a PAI matrix by the process of this invention. As such, the components of the resultant free-flowing powder are entrained one by the other, and the mixture behaves as an inseparable whole rather than as a mixture of two types of discrete particles which could be separated by an appropriate physical classifying technique. The free-flowing powder of the invention is akin to peanut brittle, not to a mix of peanuts and hard candy.

Example 2

The procedure of Example 1 was used, except for the following: A solution of PAI-2 and polyamic acid salt were prepared by combining 1.7 grams of PAI-2 and 0.31 gm of a 28.4 wt % solution of polyamic acid salt into 33.4 gm NMP. The solution was added slowly to PFA dispersion being agitated in a Waring blender. After precipitation was complete, a solution comprising 0.31 g of the polyamic acid salt solution and 1.8 g NMP was added. The resulting suspension was isolated and dried to produce a free flowing powder. The powder was suspended in isopropanol and applied as in Example 1 to smooth aluminum sheet to produce a strongly adhered coating.

Control A

The experiment in Example 1 was essentially reproduced, except that the PAI used was PAI-2, the amount of PAI/NMP solution was 36.7 g and the PAI concentration in the solution was 41.6 wt % (11.1 g of AI and 15.6 g of NMP). Upon addition of the PAI/NMP solution to the fluoropolymer dispersion, precipitation was accompanied by formation of large masses of tacky solids. These solids agglomerated further upon filtration and could not be resuspended in water. When dried, the masses could not be broken up into powder form.

This illustrates that the NMP solution must be of a sufficiently low viscosity to allow precipitation of small, discrete particles under conditions of low shear. If large masses of matrix PAI are obtained, it is not possible to break them up by processes such as grinding, either while still swollen with NMP solvent or after the lumps have been dried.

Control B

The experiment in Example 1 was essentially repeated except that a TFE homopolymer (PTFE) dispersion was used instead of PFA dispersion. Upon precipitation, the solids immediately separated from water as a hydrophobic powder. Examination of the powder indicated that it was sensitive to shear, similar to fine powder PTFE. The powder was not free-flowing, and it could not be processed in techniques such as electrostatic powder coating.

Embodiment II—Examples

PFA powder (20 micrometers avg particle size) made from coagulated PFA dispersion such as that used in Example 1 and then pelletized in accordance with European Patent EP 0226668 can be used. Such a product is available from the DuPont Company as TEFLON® PFA Powder Coating 532-5011.

FEP powder (30 micrometers avg particle size) can be made from FEP aqueous dispersion in a similar manner as the PFA powder, according to the teachings of European Patent EP 0222945. Such a product is available from The DuPont Company as TEFLON® FEP Powder Coating 532-8110.

The PES resin used was "ULTRASON E-2020 Pearl PE Sulfone" produced by BASF Corp.

PAI-1 resin as described above was used.

Example 3

Filter Process

Five compositions 3-1 to 3-5 varying in type and amount of binder resin were prepared according to the second embodiment of the invention using the filter process to isolate multicomponent particles.

Using the proportions listed in Table 1, solutions containing a polymer binder and NMP(N-methyl pyrrolidone) were prepared. To 1 Kg of the solution, PFA powder was added and mixed with a Lightning type mixer at room temperature at about 500 rpm for 1 hour.

TABLE 1

Preparation of Solutions

| Sample Number | g PES Added | g PAI Added | g NMP Added | g PFA Added | g FEP Added |
|---|---|---|---|---|---|
| 3-1, 4-1, 5-1 | 50 | 0 | 950 | 950 | 0 |
| 3-2, 4-2, 5-2 | 200 | 0 | 950 | 800 | 0 |
| 3-3, 4-3, 5-3 | 0 | 139 | 861 | 950 | 0 |
| 3-4, 4-4, 5-4 | 0 | 556 | 444 | 800 | 0 |
| 3-5, 4-5, 5-5 | 62 | 172 | 766 | 868 | 8 |
| 4-6 | 100 | 0 | 950 | 0 | 900 |

The PFA/binder solution was allowed to settle overnight. Supernatant liquid was decanted and was vacuum filtered using an analytical grade filter paper in a Bucherer funnel. The powder was tray dried at room temperature at a powder depth of about 0.5 cm for two days. The powder was then further dried in a circulating air oven having a temperature of 250° F. (121° C.) for 8 hours.

The dried powder was subjected to milling in an Alpine Model pin mill to break up large agglomerates and achieve a fine free-flowing powder. The powder was then separated by sieving through a #400 (38 micron opening) U.S.A. Standard Testing Sieve.

Particle characterization by Coulter particle size analysis. The average particle size of the multicomponent particles was determined to be about 20 micrometers with particle size ranging from 5 to 40 micrometers.

The isolated powder was applied to aluminum and cold rolled steel 4"×12" (10.1 cm×30.5 cm) panels that were grit blasted. The panels were cleaned with an acetone rinse. The application equipment was a Nordson Versaspray II Electrostatic spray gun at approximately 50,000 volts. One set of these panels were then baked minutes in a circulating air oven having a temperature of 750° F. (399° C.) for 10 minutes at 750° F. (399° C.) metal temperature as determined by a K-type thermocouple.

A second set of these panels is topcoated with TEFLON® PFA Powder Coating 532-5010 (DuPont, average particle size about 35 microns). The application equipment was a Nordson Versaspray II Electrostatic spray gun at approximately 50,000 volts. The panels were baked minutes in a circulating air oven having a temperature of 750° F. (399° C.) for 10 minutes at 750° F. (399° C.) metal temperature as determined by a K-type thermocouple.

Adhesion of the coated panels were tested by Post Boiling Water Fingernail Adhesion Test and contrasted to Control C. Results are reported below.

Control C DRY MIX

A dry blend of 380 g of PFA powder and 20 g. of PES were prepared by mixing the powder components in a Waring Blender, Model No.1L for 10 minutes at the highest speed setting and subsequently tumbling the mixture in a 1 quart glass jar at 60 rpm for 1 hour.

The powder mixture was applied to aluminum and cold rolled steel 4"×12" (10.1 cm×30.5 cm) panels that were grit blasted. The panels were cleaned with an acetone rinse. The application equipment was a Nordson Versaspray II Electrostatic spray gun at approximately 50,000 volts. One set of these panels were then baked minutes in a circulating air oven having a temperature of 750° F. (399° C.) for 10 minutes at 750F (399° C.) metal temperature as determined by a K-type thermocouple.

A second set of these panels is topcoated with TEFLON® PFA Powder Coating 532-5010 (DuPont, average particle size about 35 microns). The application equipment was a Nordson Versaspray II Electrostatic spray gun at approximately 50,000 volts. The panels were baked minutes in a circulating air oven having a temperature of 750° F. (399° C.) for 10 minutes at 750° F. (399° C.) metal temperature as determined by a K-type thermocouple.

Figure 2:
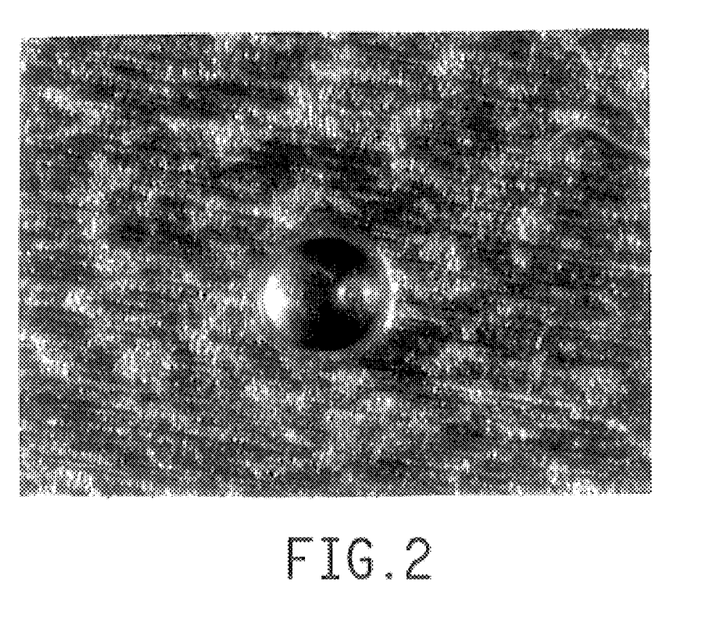
FIG. 2 is an optical micrograph at 70× of a baked coating prepared from a physical blend of fluoropolymer and polyethersulfone(PES) resulting in the PES being present as distinct particles (one particle shown) in the fused fluoropolymer matrix.

Shown in FIG. 2 is an optical micrograph at 70× of a fluoropolymer/polyethersulfone multicomponent particle composition as prepared according to Control C and applied to a clean aluminum panel and baked for 10 minutes at 750° F. (399° C.). PES is a spherical particle in the middle of the micrograph. PFA is the glassy clear portion surrounding the PES spherical particle and not visible in the micrograph. The aluminum panel under the coating is visible.

Adhesion of the coated panels were tested by Post Boiling Water Fingernail Adhesion Test. The film of Control C was easily peeled from the panels. In contrast, the films made in accordance with the present invention were much more difficult to peel or could not be peeled at all. The panels coated with films from Example 3-2 could not be peeled from either the grit blasted aluminum or steel panels with or without the PFA topcoat. Films from Example 3-5 could not be peeled from the grit blasted aluminum panel.

Example 4

Evaporation Process

As described in Example 3, six compositions 4-1 to 4-6 varying in type and amount of fluoropolymer and binder resin in were prepared according to the second embodiment of the invention using the evaporation process to isolate multicomponent particles.

Using the proportions listed in Table 1, solutions containing a polymer binder and NMP(N-methyl pyrrolidone) were prepared. To 1 Kg of the solution, fluoropolymer powder was added and mixed with a Lightning type mixer at room temperature at about 500 rpm for 1 hour.

The fluoropolymer/binder solution was tray dried at room temperature at a suspension depth of about 0.5 cm for two days. The powder was then further dried in a circulating air oven having a temperature of 250° F. (121° C.) for 8 hours.

The dried powder was subjected to milling in an Alpine Model pin mill to break up large agglomerates and achieve a fine free-flowing powder. The powder was then separated by sieving through a #400 (38 micron opening) U.S.A. Standard Testing Sieve. Particle size characterization was found to be similar to the results reported in Example 3.

The isolated powder was applied to aluminum and cold rolled steel 4"×12" (10.1 cm×30.5 cm) panels that were grit blasted. The panels were cleaned with an acetone rinse. The application equipment was a Nordson Versaspray II Electrostatic spray gun at approximately 50,000 volts. One set of these panels were then baked minutes in a circulating air oven having a temperature of 750° F. (399° C.) for 10 minutes at 750° F. (399° C.) metal temperature as determined by a K-type thermocouple.

A second set of these panels is topcoated with TEFLON® PFA Powder Coating 532-5010 (DuPont, average particle size about 35 microns). The application equipment was a Nordson Versaspray II Electrostatic spray gun at approximately 50,000 volts. The panels were baked minutes in a circulating air oven having a temperature of 750° F. (399° C.) for 10 minutes at 750° F. (399° C.) metal temperature as determined by a K-type thermocouple.

Figure 3:
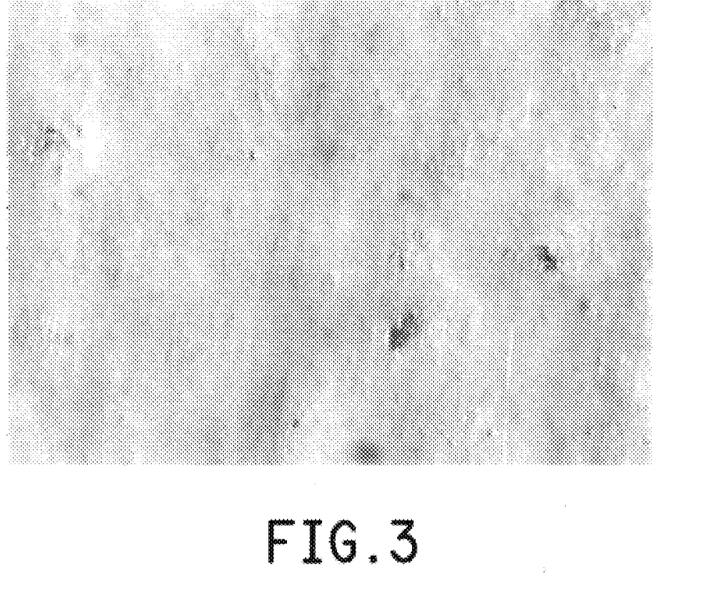
FIG. 3 is an optical micrograph at 70× of a baked coating prepared from fluoropolymer/polyethersulfone multicomponent particles of the second embodiment (Example 4-2), resulting in the PES component being indistinguishable from the fused fluoropolymer matrix.

Shown in FIG. 3 is an optical micrograph at 70× of a fluoropolymer/polyethersulfone multicomponent particle composition as prepared according to Example 4-2 and applied to a clean aluminum panel and baked for 10 minutes at 750° F. (399° C.). The amounts of PFA and PES are the same as present in Control C, but a cloudiness over the panel indicates the uniformity of distribution of the PES thereby providing adhesive binder over the entire panel, in contrast the one small spot of PES shown in FIG. 2.

Adhesion of the coated panels were tested by Post Boiling Water Fingernail Adhesion Test and compared to Control C. The film of Control C was easily peeled from the panels. In contrast, the films made in accordance with the present invention were much more difficult to peel or could not be peeled at all. The panels coated with films from Example 4-6 could not be peeled from either the grit blasted aluminum or steel panels with or without the PFA topcoat. Films from Examples 4-1 and 4-3 could not be peeled from the grit blasted aluminum panel with or without the PFA topcoat. Films from Example 4-2 could not be peeled from grit blasted aluminum with or without PFA top coated and from grit blasted steel with PFA topcoat.

Example 5

Aqueous Treatment Process

Similar to example 3, five compositions 5-1 to 5-5 varying in type and amount of binder resin were prepared according to the second embodiment of the invention using the aqueous treatment process to isolate multicomponent particles.

Using the proportions listed in Table 1, solutions containing a polymer binder and NMP(N-methyl pyrrolidone) were prepared. To 1 Kg of the solution, PFA powder was added and mixed with a Lightning type mixer at room temperature at about 500 rpm for 1 hour.

The PFA/binder solution was treated with 1 Kg of water, added slowly while the Lightning mixer continued mixing. The PAI/binder precipitates or kicks out of solution, resulting in a mass that looks like cottage cheese. The solid material is removed by decanting the water/NMP liquid and the resin mass was tray dried at room temperature at a suspension depth of about 0.5 cm for two days. The powder was then further dried in a circulating air oven having a temperature of 250° F. (121° C.) for 8 hours.

The dried powder was subjected to milling in an Alpine Model pin mill to break up large agglomerates and achieve a fine free-flowing powder. The powder was then separated by sieving through a #400 (38 micron opening) U.S.A. Standard Testing Sieve. Particle size characterization was found to be similar to the results reported in Example 3.

The isolated powder was applied to aluminum and cold rolled steel 4"×12" panels that were grit blasted. The panels were cleaned with an acetone rinse. the application equipment was a Nordson Versaspray II Electrostatic spray gun at approximately 50,000 volts. One set of these panels were then baked minutes in a circulating air oven having a temperature of 750° F. (399° C.) for 10 minutes at 750° F. (399° C.) metal temperature as determined by a K-type thermocouple.

A second set of these panels is topcoated with TEFLON® PFA Powder Coating 532-5010 (DuPont, average particle size about 35 microns). The application equipment was a Nordson Versaspray II Electrostatic spray gun at approximately 50,000 volts. The panels were baked minutes in a circulating air oven having a temperature of 750° F. (399° C.) for 10 minutes at 750° F. (399° C.) metal temperature as determined by a K-type thermocouple.

Adhesion of the coated panels were tested by Post Boiling Water Fingernail Adhesion Test and compared to Control C. The film of Control C was easily peeled from the panels. In contrast, the films made in accordance with the present invention were much more difficult to peel or could not be peeled at all. The panels coated with films from Example 5-2 could not be peeled from grit blasted aluminum panels with or without the PFA topcoat. Films from Examples 5-1 and 5-5 could not be peeled from the grit blasted aluminum panel with the PFA topcoat.

Embodiment III—Examples

The functional monomer used in Examples 6–10 was $CF_2=CF-[OCF_2CF(CF_3)]-O-CF_2CF_2-COOH$ or 8-carboxyl-perfluoro(3,6-dioxa-5-methyl-1-octene), hereinafter EVE-COOH. See U.S. Pat. No. 4,138,426.

The polymer binder resin used in the following Examples was a PAI resin, Torlon® AI-10 poly(amide-imide) (Amoco Chemicals Corp.), a solid resin containing 6–8% of residual, and was used as received. The PAI resin was used in the following Examples as a 5 wt. % solution in NMP.

Example 6

Preparation of Functional Core/Shell Fluoropolymer

Figure 4:
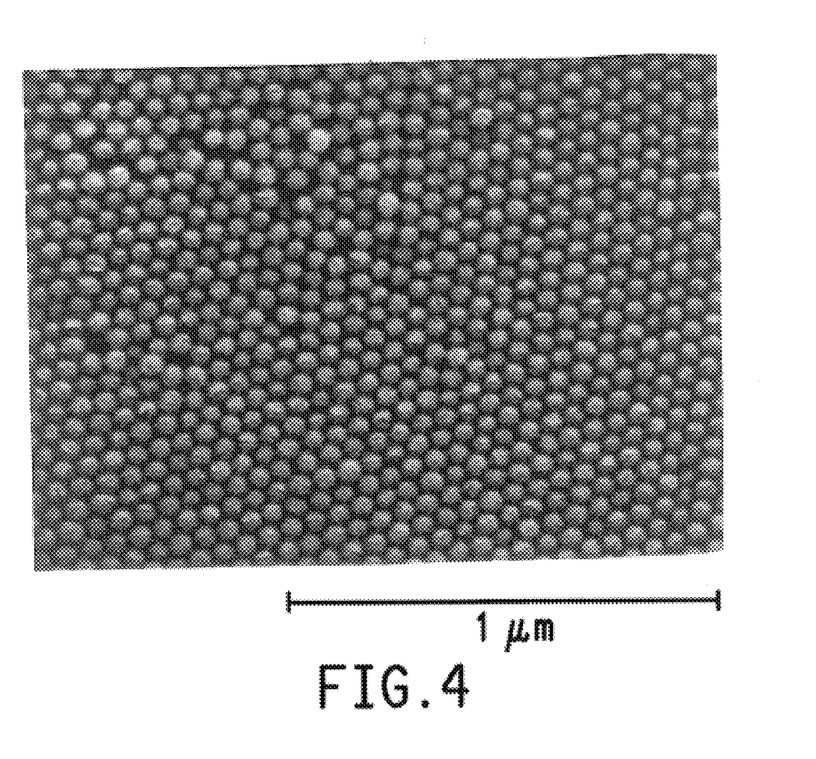
FIG. 4 is a scanning electron micrograph at 60,000 magnification of a layer of functionalized fluoropolymer dispersion particles isolated from the dispersion of Example 6. Note 0.1 micrometer scale bar.

A 1-gal autoclave was charged with 2300 mL of demineralized water and deaerated by evacuation and purging with nitrogen. While under vacuum, 25 g of a 20 wt % solution of C-8, 17 mL of PEVE and 1 g of ethane were added. The temperature was increased to 80° C. and the pressure was increased to 300 psig (2.17 MPa) by addition of TFE. An initial initiator charge of 60 mL of a 2 g/L aqueous solution of APS was added. At kickoff, as determined by a 5 psi (0.03 MPa) pressure drop, a feed of a mixture of TFE and PEVE in the ratio TFE:PEVE=97.1:2.9 by weight was begun to maintain pressure at 300 psig. Also, an addition of 0.5 mL/min of the same initiator solution was begun and was continued throughout the polymerization. When 600 g of TFE/PEVE mixture had been added after kickoff, 10 mL of EVE-COOH were added. After 650 g of TFE/PEVE mixture had been added after kickoff, all feeds were stopped and the pressure was allowed to drop to 150 psig (1.1 MPa). The reactor was vented and cooled, and the product dispersion was collected. Solids content of the dispersion was 20.2 wt %. Electron photomicroscopy showed that the average fluoropolymer particle size in the dispersion was about 0.13–0.14 $\mu$m as shown in FIG. 4. Polymer solids were isolated from an aliquot of the dispersion by shear coagulation with addition of enough nitric acid to produce a clear mother liquor. The dried product resin contained 6.0 wt % of PEVE and 1.9 wt % of units derived from EVE-COOH as determined by NMR analysis. Melting point was 289° C.

Example 7

Coating of Fluoropolymer with PAI

Six small vials were charged with the various amounts listed in Table 5 of the raw fluoropolymer dispersion (FP Disp) of Example 6. Then, 5 g of 5 wt % PAI/NMP solution were added to each vial and the contents were mixed gently by inverting the vials. Table 2 also shows the ratio (PAI/FP) of PAI resin to fluoropolymer resin on a solids-added basis. Precipitates formed immediately in each instance and settled to the bottom of the vials as yellow-brown masses, with the liquid phases having differing degrees of turbidity and yellow color. The liquid of Example 7-4 had the best combination of clarity and lightness of color. For those tests in which less fluoropolymer dispersion was used, the supernate was clear but darker yellow, while for those tests in which more fluoropolymer dispersion was used, the supernate was light but turbid.

TABLE 5

Dispersion Amounts and Solids Ratios for Example 7

| Ex. | FP Disp (g) | PAI/FP (wt/wt) |
| --- | --- | --- |
| 7-1 | 0.208 | 1/0.2 |
| 7-2 | 1.04 | 1/1 |
| 7-3 | 2.08 | 1/2 |
| 7-4 | 2.60 | 1/2.5 |
| 7-5 | 3.12 | 1/3 |
| 7-6 | 4.16 | 1/4 |

Example 8

Coated Particle Characterization

Figure 5:
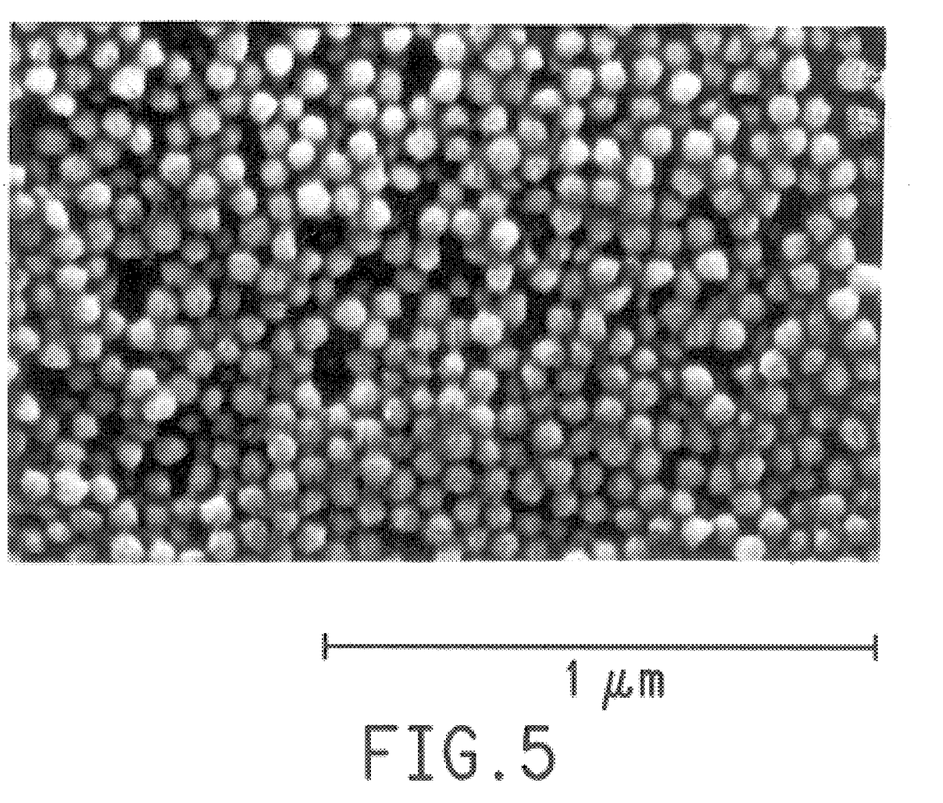
FIG. 5 is a scanning electron micrograph at 60,000 magnification of fluoropolymer/polymer binder multicomponent particles of the third embodiment as prepared in Example 7 from the dispersion of Example 6. The chemical interaction between the functionalized fluoropolymer and the polymer binder is visibly indicated by the slightly larger particle size of particles in FIG. 5 as compared to FIG. 4. The multicomponent particles of FIG. 5 are also less spherical and less ordered (i.e., possess a less regular packing order) than the particles of FIG. 4.

The procedure of Example 7-2 was essentially repeated, and the mixture was allowed to stand overnight. The yellowish liquid was decanted off, and the yellow-brown sediment was dispersed in approximately 5 g of NMP. The resultant suspension was stable as judged from the absence of sediment the next day. Scanning electron microscopy showed that the resultant particles were larger than the fluoropolymer raw dispersion particles, with an average particle size of about 0.15–0.16 $\mu$m as shown in FIG. 5. This indicates, surprisingly, that the PAI resin coats the fluoropolymer particles in a thin layer. The increase in particle size is calculated to be within the range expected based on the solids ratio of components, with some PAI resin remaining in solution as indicated by residual color of the medium. The thickness (thinness) of the coating layer provides an PAI surface corresponding to smaller effective PAI particle size than can be produced by precipitation, conventional grinding or other comminution processes.

Example 9

The procedure of Example 7-4 was essentially repeated, except that the amounts of dispersion and solution were increased to obtain a larger quantity of precipitate. The solids formed were isolated by centrifuging, then were washed with demineralized water and dried. Aggregates were broken up by grinding briefly in a rotary blade mill (Model A10 S1, Janke & Kunkel KG) and screened through a 75 $\mu$m screen. An aliquot of the dry powder was used to make a 10 wt % suspension of the fluoropolymer/PAI composition in NMP, and the suspension was used to draw down a 4 mil (0.1 mm) thick wet film on sandblasted steel. The coating was baked at 250° C. for 30 min. Then, a 10 mil (0.25 mm) thick film of TFE/PPVE copolymer (Teflon® PFA fluoropolymer film, grade 340, DuPont) was pressed onto the fluoropolymer/PAI coating in a laboratory press at 350° C. Adhesion of the PFA film was tested to the fluoropolymer/PAI coating, and of the fluoropolymer/PAI coating to the steel substrate using the PWA test. Both were excellent after two days in boiling water, demonstrating the adhesion of the composition to a metal substrate and the utility of the composition of the invention as a primer in multi-layer fluoropolymer coatings.

Example 10

Dried solids from Example 9 were coated onto an aluminum panel by electrostatic spraying, followed by baking at 750°–800° F. (399°–427° C.) for 10 min. Adhesion of the coated particles to the aluminum was excellent, as indicated by scratch testing, before and after boiling in water for 1 hr.

What is claimed is:

1. A composition comprising a plurality of multicomponent particles, one component of each of said particles being melt-fabricable fluoropolymer and another component of each of said particles being a high temperature resistant non-dispersed polymer binder.

2. The composition of claim 1 in the form of a free-flowing powder.

3. The composition of claim 1 in the form of a liquid suspension.

4. The composition of claim 1 wherein said components are bound together by mechanical engagement.

5. The composition of claim 4 wherein said mechanical engagement is in the form of said fluoropolymer component being dispersed in a matrix of said polymer binder or in the form of a core of fluoropolymer coated with said polymer binder.

6. The composition of claim 5 wherein said fluoropolymer component is derived from fundamental particles of aqueous fluoropolymer dispersion.

7. The composition of claim 6 wherein said fluoropolymer core is derived from particles of fluoropolymer powder.

8. The composition of claim 1 wherein said components are bound together by chemical interaction.

9. The composition of claim 8 wherein said fluoropolymer and said polymer binder are chemically bound to one another and said polymer binder is in the form of a coating around a core of said fluoropolymer.

10. The composition of claim 9 wherein the fluoropolymer is derived from fundamental particles of aqueous fluoropolymer dispersion and contains units of polar functional groups.

11. The composition of claim 1 in the form of a baked layer.

12. The composition of claim 11 as a coating on a metallic substrate.

13. The composition of claim 12 as a primer on a metallic substrate.

14. The composition of claim 1 wherein high temperature resistant polymer binder comprises one member or a combination of members selected from the group consisting of polysulfones, polyethersulfones, polyimides, polyamide imides, and polyamic acid salt.

15. The process of making a composition comprising multicomponent particles, one component of each of said particles being melt fabricable fluoropolymer and another component of each of said particles being a high temperature resistant polymer binder by combining particles of said melt-fabricable fluoropolymer with a solution of said high temperature resistant polymer binder, mixing said fluoropolymer with said solution of polymer binder and isolating a composition of multicomponent particles.

16. The process of claim 15 wherein said composition is in the form of a free-flowing powder.

17. The process of claim 16 wherein said melt-fabricable fluropolymer is added in the form of an aqueous fluoropolymer dispersion of fundamental particles.

18. The process of claim 17 wherein solvent for said polymer binder is present in said solution and said solvent is miscible with the water present in said aqueous dispersion.

19. The process of claim 18 wherein the surface of said fundamental fluoropolymer particles contain units of polar functional groups.

20. The process of claim 18 wherein said mixing is done under conditions of high shear.

21. The process of claim 16 wherein said melt-fabricable fluoropolymer is added in the form of particles of fluoropolymer powder.

22. The process of claim 21 wherein said multicomponent particles are isolated by filtration.

23. The process of claim 21 wherein the multicomponent particles are isolated by evaporation.

24. The process of claim 21 wherein the multicomponent particles are isolated by aqueous treatment.

25. The composition of claim 1 wherein said fluoropolymer is a single fluoropolymer.

26. The composition of claim 1 wherein said polymer binder is a single polymer binder.

27. The composition of claim 1 wherein said fluoropolymer is a single fluoropolymer and said polymer binder is a single polymer binder.

* * * * *